United States Patent
Inokuchi

(10) Patent No.: US 11,485,826 B2
(45) Date of Patent: Nov. 1, 2022

(54) PRODUCTION METHOD FOR SILICA-COATED SPHERICAL SILICONE ELASTOMER PARTICLES AND SILICA-COATED SPHERICAL SILICONE ELASTOMER PARTICLES

(71) Applicant: Shin-Etsu Chemical Co., Ltd., Tokyo (JP)

(72) Inventor: Yoshinori Inokuchi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 136 days.

(21) Appl. No.: 16/755,229

(22) PCT Filed: Oct. 5, 2018

(86) PCT No.: PCT/JP2018/037321
§ 371 (c)(1),
(2) Date: Apr. 10, 2020

(87) PCT Pub. No.: WO2019/078028
PCT Pub. Date: Apr. 25, 2019

(65) Prior Publication Data
US 2020/0317871 A1 Oct. 8, 2020

(30) Foreign Application Priority Data

Oct. 17, 2017 (JP) .............................. JP2017-201011

(51) Int. Cl.
*C08J 3/12* (2006.01)
*C08G 77/32* (2006.01)
*C08K 3/36* (2006.01)

(52) U.S. Cl.
CPC .............. *C08J 3/128* (2013.01); *C08G 77/32* (2013.01); *C08K 3/36* (2013.01); *C08J 2383/04* (2013.01)

(58) Field of Classification Search
CPC ....... C08J 3/128; C08J 2383/04; C08G 77/32; C08K 3/36
See application file for complete search history.

(56) References Cited

U.S. PATENT DOCUMENTS

| 5,928,660 A | 7/1999 | Kobayashi et al. |
| 5,945,471 A * | 8/1999 | Morita ............... B29B 9/16 524/588 |

(Continued)

FOREIGN PATENT DOCUMENTS

| JP | 4-348143 A | 12/1992 |
| JP | 9-208709 A | 8/1997 |

(Continued)

OTHER PUBLICATIONS

International Search Report, issued in PCT/JP2018/037321, PCT/ISA/210, dated Jan. 8, 2019.

(Continued)

*Primary Examiner* — Robert A Vetere
(74) *Attorney, Agent, or Firm* — Birch, Stewart, Kolasch & Birch, LLP

(57) ABSTRACT

A method for producing silica-coated spherical silicone elastomer particles which includes a step in which a tetraalkoxysilane (E) is added to a liquid comprising spherical silicone elastomer particles (A), an alkaline substance (B), one or more ingredients (C) selected from among cationic surfactants and cationic water-soluble polymers, and water (D), and the tetraalkoxysilane is hydrolyzed and condensed to thereby coat the surfaces of the spherical silicone elastomer particles with silica.

7 Claims, 1 Drawing Sheet

(56) References Cited

U.S. PATENT DOCUMENTS

| | | | |
|---|---|---|---|
| 5,948,469 A | 9/1999 | Morita et al. | |
| 2010/0203095 A1 | 8/2010 | Inokuchi et al. | |
| 2010/0328895 A1 | 12/2010 | Bhagwagar et al. | |
| 2012/0101227 A1 | 4/2012 | Galeone et al. | |
| 2015/0125612 A1* | 5/2015 | Campeol | B01J 13/18 427/340 |

FOREIGN PATENT DOCUMENTS

| | | |
|---|---|---|
| JP | 10-175816 A | 6/1998 |
| JP | 2010-180335 A | 8/2010 |
| JP | 2012-532210 A | 12/2012 |
| JP | 2013-243404 A | 12/2013 |
| JP | 2015-526365 A | 9/2015 |

OTHER PUBLICATIONS

Written Opinion of the International Searching Authority, issued in PCT/JP2018/037321, PCT/ISA/237, dated Jan. 8, 2019.

* cited by examiner

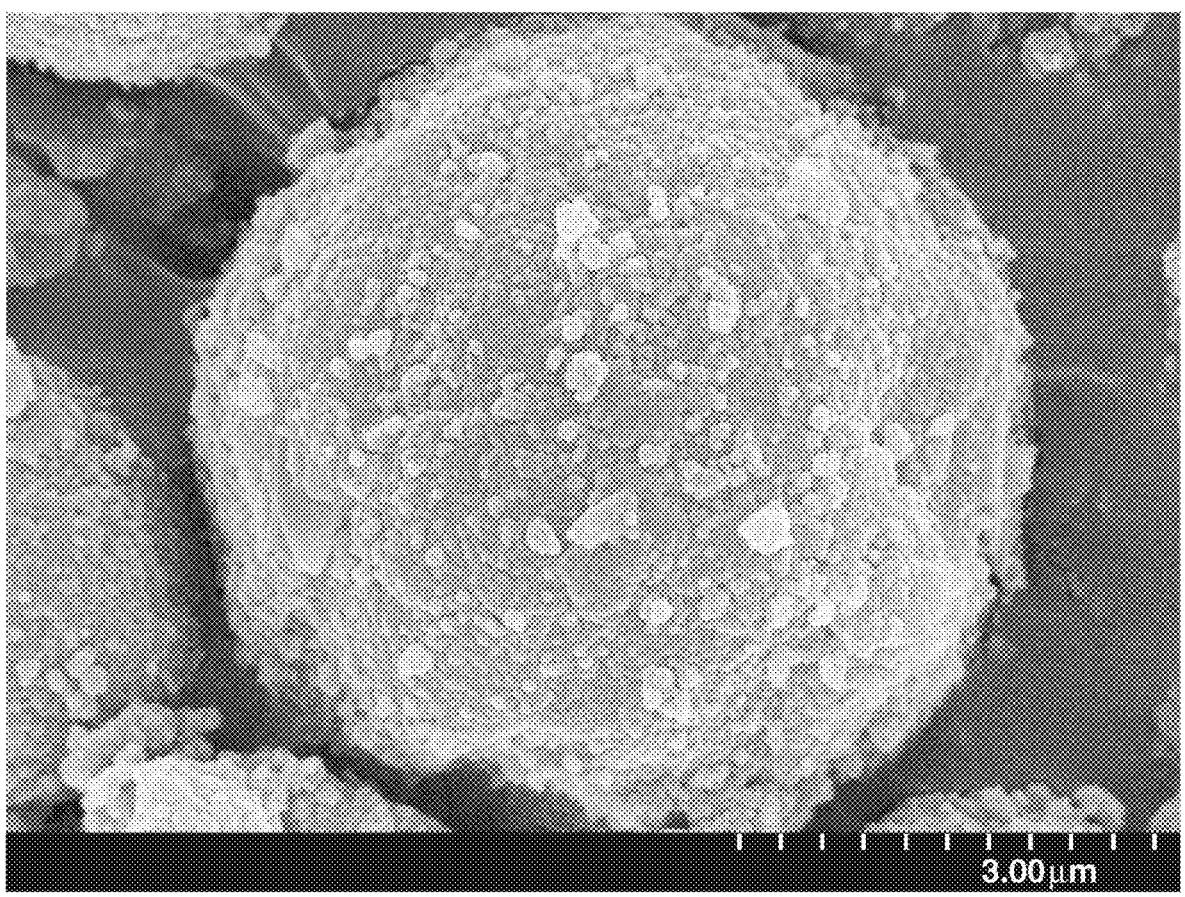

PRODUCTION METHOD FOR SILICA-COATED SPHERICAL SILICONE ELASTOMER PARTICLES AND SILICA-COATED SPHERICAL SILICONE ELASTOMER PARTICLES

TECHNICAL FIELD

The present invention relates to a method for producing silica-coated spherical silicone elastomer particles in which the particle surfaces are coated with silica, and to silica-coated spherical silicone elastomer particles.

BACKGROUND ART

Silicone elastomer particles which have a rubber-like elasticity are used as a resin stress relaxing agent. For example, epoxy resins and other thermoset resins used in electronic and electric component packaging are compounded with silicone elastomer particles in order to make the package resistant to breakage even when subjected to stress from expansion due to heat generation by the electrical components. Such particles are also used in cosmetic materials for the purpose of imparting a feel on use that is soft to the touch and smooth as well as a good spreadability.

However, because silicone elastomer particles have a strong tendency to agglomerate and a poor dispersibility in resins and cosmetic materials, the desired property-imparting effects are sometimes not fully achieved, lowering the resin strength or causing the feel on use of the cosmetic material to instead decline.

In order to resolve this problem, silicone elastomer particles coated on the surface with particles of a metal oxide such as silica have been described (Patent Document 1: JP-A H04-348143). Such coated particles are characterized by having rubber-like elasticity, little tendency to agglomerate, and high dispersibility in resins and cosmetic materials.

There are methods for coating the surfaces of core particles with other particles in which an apparatus such as a ball mill or a hybridizer is used to dry mix the particles and also apply impact forces. However, when the core particles are spherical silicone elastomer particles, because they have a high tendency to agglomerate, it is difficult to break them down to primary particles and coat them with other particles. Moreover, given that the core particles are made of an elastomer, they end up absorbing the impact forces that are applied, making then difficult to properly coat.

The above-cited JP-A H04-348143 describes the production of particles in which the surfaces of spherical silicone elastomer particles are coated with metal oxide particles by removing water from an aqueous dispersion of spherical silicone elastomer particles and a metal oxide sol. A specific example mentioned therein is the method of removing water by spray drying. In this method, non-coating metal oxide particles are sometimes produced, making for a poor efficiency. Also, particularly in cases where the silicone elastomer particles are of a small size, production without the mutual agglomeration of spherical silicone elastomer particles can be a challenge.

PRIOR ART DOCUMENTS

Patent Documents

Patent Document 1: JP-A H04-348143

SUMMARY OF INVENTION

Technical Problem

The present invention was arrived at in light of the above circumstances. The object of this invention is to provide a method for efficiently producing spherical silicone elastomer particles whose surfaces are coated with silica, without allowing the spherical silicone elastomer particles to agglomerate.

Solution to Problem

The inventor, as a result of conducting extensive investigations in order to achieve this object, has discovered that the above problems can be resolved by a method for producing silica-coated spherical silicone elastomer particles having a volume-mean particle size of from 0.1 to 100 μm wherein the surfaces of spherical silicone elastomer particles are coated with silica in a ratio of from 0.5 to 200 parts by weight of silica per 100 parts by weight of the spherical silicone elastomer particles, which method includes the step of coating the surfaces of spherical silicone elastomer particles with silica by adding (E) a tetraalkoxysilane to a liquid containing (A) spherical silicone elastomer particles, (B) an alkaline substance, (C) one or more ingredient selected from cationic surfactants and cationic water-soluble polymeric compounds and (D) water, and subjecting the tetraalkoxysilane to hydrolytic condensation. This discovery ultimately led to the present invention.

Accordingly, the invention provides the following.

1. A method for producing silica-coated spherical silicone elastomer particles that have a volume-mean particle size of from 0.1 to 100 μm and are made of spherical silicone elastomer particles coated on surfaces thereof with silica in a ratio of from 0.5 to 200 parts by weight of the silica per 100 parts by weight of the spherical silicone elastomer particles, which method includes the step of coating the surfaces of spherical silicone elastomer particles with silica by adding (E) a tetraalkoxysilane to a liquid containing (A) spherical silicone elastomer particles, (B) an alkaline substance, (C) one or more ingredient selected from cationic surfactants and cationic water-soluble polymeric compounds and (D) water and subjecting the tetraalkoxysilane to hydrolytic condensation.
2. The method for producing silica-coated spherical silicone elastomer particles of 1 above, wherein the amount of component (C) is from 0.01 to 2 parts by weight per 100 parts by weight of component (D).
3. The method for producing silica-coated spherical silicone elastomer particles of 1 or 2 above, wherein the liquid containing components (A) to (D) has a pH at 25° C. of from 9.0 to 12.0.
4. The method for producing silica-coated spherical silicone elastomer particles of any of 1 to 3 above, wherein component (E) is tetramethoxysilane.
5. The method for producing silica-coated spherical silicone elastomer particles of any of 1 to 4 above, wherein component (C) is an alkyltrimethylammonium salt.
6. Silica-coated spherical silicone elastomer particles obtained by the production method of any of 1 to 5 above.

Advantageous Effects of Invention

The production method of the invention enables silica-coated spherical silicone elastomer particles in which the particle surfaces are coated with silica to be efficiently produced without allowing the spherical silicone elastomer particles used in production to agglomerate. Moreover, the silica-coated spherical silicone elastomer particles obtained by the production method of the invention have little tendency to agglomerate and a high dispersibility, and are thus expected to have a high resin stress relaxing effect. In addition, in cosmetics applications, the particles thus produced are expected to have an enhanced ability to impart a feel on use that is soft to the touch and smooth as well as a good spreadability. It is also possible to have the particles be hydrophilic, thus enabling them to be included in aqueous cosmetic materials without the use of dispersants such as emulsifying agents.

BRIEF DESCRIPTION OF DRAWINGS

FIG. 1 shows an electron micrograph of a silica-coated spherical silicone elastomer particle obtained in Example 1.

DESCRIPTION OF EMBODIMENTS

The invention is described more fully below.

This invention is directed at a method for producing silica-coated spherical silicone elastomer particles that have a volume-mean particle size of from 0.1 to 100 μm and are made of spherical silicone elastomer particles whose surfaces are coated with silica in a ratio of from 0.5 to 200 parts by weight of the silica per 100 parts by weight of the spherical silicone elastomer particles.

[Spherical Silicone Elastomer Particles]

The spherical silicone elastomer particles of the invention have a particle shape that is spherical and a volume mean particle size that is preferably from 0.1 to 100 μm, and more preferably from 0.5 to 40 μm. At a volume mean particle size for the spherical silicone elastomer particles that is below 0.1 μm, the resulting silica-coated spherical silicone elastomer particles (sometimes referred to below as "silica-coated particles") have a high tendency to agglomerate, as a result of which they may not readily disperse to primary particles. On the other hand, at a volume mean particle size for the spherical silicone elastomer particles that is larger than 100 μm, in resin stress relaxing agent applications, properties such as the strength of the base resin are compromised, in addition to which a stress relaxing effect may not be sufficiently exhibited. Also, in cosmetic applications, the silky feel and smoothness may diminish and a gritty feel may arise.

In this invention, the volume mean particle size is measured for an aqueous dispersion of spherical silicone elastomer particles serving as the starting material by a method that is suitably selected according to the particle size from among, for example, microscope methods, light scattering methods, laser diffraction methods, sedimentation in liquid methods and electrical sensing zone methods. At mean particle sizes of 1 μm or more, measurement is carried out by an electrical sensing zone method; at mean particle sizes below 1 μm, measurement is carried out by a laser diffraction/scattering method. In electrical sensing zone methods, when the particles to be measured are hydrophilic particles or an aqueous dispersion, they may be added directly to an aqueous solution of a specified electrolyte, dispersed by stirring, and measured. In laser diffraction/scattering methods, water is used as the dispersion medium; when the particles to be measured are hydrophilic particles or an aqueous dispersion, they may be added directly to the water, dispersed by stirring, and measured. Whichever measurement method is used, in cases where the sample is water-repellent particles, the particles must be dispersed in water by concomitantly using a surfactant or a water-soluble polymer.

In this Specification, "spherical" does not mean that the particle shapes are limited only to true spheres; rather, it is meant to encompass also distorted ellipsoids in which the ratio of the length of the longest axis to the length of the shortest axis (aspect ratio) is on average generally in the range of 1 to 4, preferably 1 to 2, more preferably 1 to 1.6, and even more preferably 1 to 1.4. The particle shapes can be ascertained by examination with an optical microscope or an electron microscope.

The silicone elastomer making up the spherical silicone elastomer particles is preferably free of tack and has a rubber hardness, as measured with a type A durometer in accordance with JIS K 6253, in the range of preferably from 5 to 90, and more preferably from 20 to 70. By setting the rubber hardness to at least 5, the silica-coated particles obtained have a higher dispersibility. At a rubber hardness greater than 90, the resin stress relaxing effect may decrease and the soft touch may diminish. The rubber hardness is a value measured by fabricating test pieces made up of the spherical silicone elastomer particles and having the shape and dimensions specified in JIS K 6253.

The silicone elastomer is exemplified by cured products having linear organosiloxane blocks of the formula

$$—(R^1{}_2SiO_{2/2})_n— \qquad (1)$$

In this formula, each $R^1$ is a substituted or unsubstituted monovalent hydrocarbon group of 1 to 30 carbon atoms, and n is a positive number from 5 to 5,000.

$R^1$ is exemplified by alkyl groups such as methyl, ethyl, propyl, butyl, pentyl, hexyl, heptyl, octyl, decyl, undecyl, dodecyl, tetradecyl, pentadecyl, hexadecyl, heptadecyl, octadecyl, nonadecyl, icosyl, henicosyl, docosyl, tricosyl, tetracosyl and triacontyl groups; aryl groups such as phenyl, tolyl and naphthyl groups; aralkyl groups such as benzyl and phenethyl groups; alkenyl groups such as vinyl and allyl groups; cycloalkyl groups such as cyclopentyl, cyclohexyl and cycloheptyl groups; and hydrocarbon groups in which some or all hydrogen atoms bonded to carbon atoms on the foregoing groups are substituted with atoms such as halogen atoms (fluorine, chlorine, bromine or iodine atoms) and/or substituents such as acryloyloxy, methacryloyloxy, epoxy, glycidoxy and carboxyl groups.

The silicone elastomer can be obtained from a curable liquid silicone composition. Such curing is exemplified by curing via a condensation reaction between methoxysilyl groups ($\equiv$SiOCH$_3$) and hydroxysilyl groups ($\equiv$SiOH), a radical reaction between mercaptopropylsilyl groups ($\equiv$Si—C$_3$H$_6$SH) and vinylsilyl groups ($\equiv$SiCH=CH$_2$), or an addition reaction between vinylsilyl groups ($\equiv$SiCH=CH$_2$) and hydrosilyl groups ($\equiv$SiH). In terms of reactivity, curing via an addition reaction is preferred. As used herein, "curable liquid silicone composition" refers to a composition which includes an ingredient or ingredients having the reactive groups in the above curing reactions (i.e., one ingredient having both reactive groups, or one ingredient having one reactive group and another ingredient having the other reactive group) and a curing catalyst. Ingredients having a reactive group or groups are exemplified by organopolysiloxanes having both reactive groups, mixtures of an organopolysiloxane having one reactive group and an organopolysiloxane having the other reactive group, and mixtures of an organopolysiloxane containing one reactive group and a silane containing the other reactive group. In the case of addition reaction curing-type curable liquid silicone compositions, these include, for example, an organopolysiloxane having at least two monovalent olefinic unsaturated groups and an organohydrogenpolysiloxane having at least three silicon-bonded hydrogen atoms per molecule, or an organopolysiloxane having at least three monovalent olefinically unsaturated groups and an organohydrogenpolysiloxane having at least two silicon-bonded hydrogen atoms per molecule, and a platinum family metal catalyst.

When the silicone elastomer is to be obtained by curing via an addition reaction, in either a combination of an organopolysiloxane of average compositional formula (2) below

$$R^2{}_a R^3{}_b SiO_{(4-a-b)/2} \quad (2)$$

and having at least two monovalent olefinic unsaturated groups per molecule with an organohydrogenpolysiloxane of average compositional formula (3) below

$$R^4{}_c H_d SiO_{(4-c-d)/2} \quad (3)$$

and having at least three silicon-bonded hydrogen atoms (Si—H) per molecule or a combination of an organopolysiloxane of average compositional formula (2) below

$$R^2{}_a R^3{}_b SiO_{(4-a-b)/2} \quad (2)$$

and having at least three monovalent olefinic unsaturated groups per molecule with an organohydrogenpolysiloxane of average compositional formula (3) below

$$R^4{}_c H_d SiO_{(4-c-d)/2} \quad (3)$$

and having at least two silicon-bonded hydrogen atoms per molecule, a liquid silicone composition wherein the organopolysiloxane having monovalent olefinically unsaturated groups and the organohydrogenpolysiloxane are included in a ratio such that there are from 0.5 to 2 hydrosilyl groups per monovalent olefinically unsaturated group should be subjected to an addition reaction in the presence of a platinum family metal catalyst.

Here, $R^2$ and $R^4$ in the formulas are substituted or unsubstituted monovalent hydrocarbon groups of 1 to 30 carbon atoms, exclusive of aliphatic unsaturated groups, and $R^3$ is a monovalent olefinically unsaturated group of 2 to 6 carbon atoms.

The subscripts "a" and "b" are positive numbers such that $0<a<3$, $0<b\le3$ and $0.1\le a+b\le3$, and preferably such that $0<a\le2.295$, $0.005\le b\le2.3$ and $0.5\le a+b\le2.3$. $R^4$ is a substituted or unsubstituted monovalent hydrocarbon group of 1 to 30 carbon atoms, exclusive of aliphatic unsaturated groups. The subscripts "c" and "d" are positive numbers such that $0<c<3$, $0<d\le3$ and $0.1\le c+d\le3$, and preferably such that $0<c\le2.295$, $0.005\le d\le2.3$ and $0.5\le c+d\le2.3$. These are suitably selected such that the organopolysiloxane has at least two or three monovalent olefinically unsaturated groups per molecule and the organohydrogenpolysiloxane has at least two or three silicon-bonded hydrogen atoms per molecule.

$R^2$ is exemplified by alkyl groups such as methyl, ethyl, propyl, butyl, pentyl, hexyl, heptyl, octyl, decyl, undecyl, dodecyl, tetradecyl, pentadecyl, hexadecyl, heptadecyl, octadecyl, nonadecyl, icosyl, henicosyl, docosyl, tricosyl, tetracosyl and triacontyl groups; aryl groups such as phenyl, tolyl and naphthyl groups; aralkyl groups such as benzyl and phenethyl groups; cycloalkyl groups such as cyclopentyl, cyclohexyl and cycloheptyl groups; and hydrocarbon groups in which some or all hydrogen atoms bonded to carbon atoms on the foregoing groups are substituted with atoms such as halogen atoms (fluorine, chlorine, bromine or iodine atoms) and/or substituents such as acryloyloxy, methacryloyloxy, epoxy, glycidoxy and carboxyl groups. Industrially, it is preferable for at least 50 mol % of all the $R^2$ groups to be methyl groups.

$R^3$ is exemplified by vinyl, allyl, butenyl, pentenyl and hexenyl groups, with vinyl groups being industrially preferred. $R^4$ is exemplified in the same way as $R^2$ above.

When the kinematic viscosities at 25° C. of the olefinically unsaturated group-containing organopolysiloxane and organohydrogenpolysiloxane exceed 100,000 mm$^2$/s, obtaining particles having a narrow distribution is sometimes difficult in the subsequently described production method. Hence, the kinematic viscosity is preferably in the range of 1 to 100,000 mm$^2$/s, and is more preferably 10,000 mm$^2$/s or less. The olefinically unsaturated group-containing organopolysiloxane and organohydrogenpolysiloxane have structures which may be linear, cyclic or branched, although one that is linear is especially preferred. The kinematic viscosities are values measured with an Ostwald viscometer.

Olefinically unsaturated group-containing organopolysiloxanes having a linear structure are exemplified by compounds of formula (4) below.

[Chem. 1]

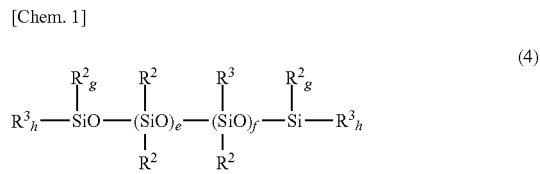

In the formula, $R^2$ and $R^3$ represent the same groups as in formula (2) above, e is an integer from 1 to 1,500, f is 0 or an integer from 1 to 500, g and h are each 0, 1, 2 or 3, g+h=3 and 2h+f≥2.

Organohydrogenpolysiloxanes having a linear structure are exemplified by compounds of general formula (5) below.

[Chem. 2]

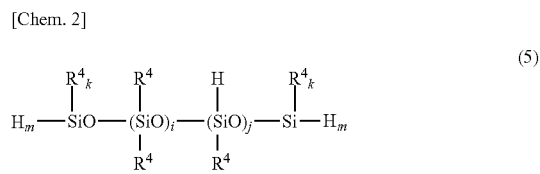

In the formula, $R^4$ represents the same group as in formula (3) above, i is an integer from 1 to 1,500, j is 0 or an integer from 1 to 500, k and m are each 0, 1, 2 or 3, k+m=3 and 2m+j≥2.

As mentioned above, it is preferable to have the combination be one in which the olefinically unsaturated group-containing organopolysiloxane has at least two monovalent olefinically unsaturated groups per molecule and the organohydrogenpolysiloxane has at least three silicon-bonded hydrogen atoms, or one in which the olefinically unsaturated group-containing organopolysiloxane has at least three monovalent olefinically unsaturated groups per molecule and the organohydrogenpolysiloxane has at least two silicon-bonded hydrogen atoms. Unless the polysiloxane structure and combination are set in this way, the resulting cured elastomer may be tacky.

The platinum family metal-based catalysts used in these reactions are exemplified by known catalysts that can be used in hydrosilylation reactions. Specific examples include uncombined platinum family metals such as platinum (including platinum black), rhodium and palladium; platinum chloride, chloroplatinic acid and chloroplatinic acid salts such as $H_2PtCl_4 \cdot nH_2O$, $H_2PtCl_6 \cdot nH_2O$, $NaHPtCl_6 \cdot nH_2O$, $KHPtCl_6 \cdot nH_2O$, $Na_2PtCl_6 \cdot nH_2O$, $K_2PtCl_4 \cdot nH_2O$, $PtCl_4 \cdot nH_2O$, $PtCl_2$ and $Na_2HPtCl_4 \cdot nH_2O$ (wherein n is an integer from 0 to 6, and is preferably 0 or 6); alcohol-modified chloroplatinic acids (see U.S. Pat. No. 3,220,972); complexes of chloroplatinic acid and an olefin (see U.S. Pat. Nos. 3,159,601, 3,159,662 and 3,775,452), platinum family metals such as platinum black or palladium that are supported on a support such as alumina, silica or carbon; rhodium-olefin complexes; chlorotris(triphenylphosphine)rhodium (Wilkinson's catalyst); and complexes of platinum, platinum chloride, chloroplatinic acid or a chloroplatinic acid salt with a vinyl group-containing siloxane, especially complexes of platinum with a vinyl group-containing disiloxane or a vinyl group-containing cyclic siloxane.

The content of the platinum family metal-based catalyst may be an amount that is effective as a hydrosilylation reaction catalyst, this being an amount such that the amount of platinum family metal in the catalyst with respect to the total amount of the reactive group-containing ingredients in the curing reaction, expressed by weight, is typically from about 0.1 ppm to about 500 ppm, preferably from about 0.1 ppm to about 200 ppm, and more preferably from about 0.5 ppm to about 100 ppm.

It is acceptable for unreacted liquid silicone to remain in the spherical silicone elastomer particles, although such liquid silicone may bleed out through gaps in the coating silica. When liquid silicone adheres to the surface of the coating silica, the particles become water-repelling. Hence, in cases where hydrophilic particles are desired, it is advantageous to reduce the amount of unreacted liquid silicone.

The spherical silicone elastomer particles may include therein silicone oils, organosilanes, inorganic powders, organic powders and the like.

The spherical silicone elastomer particles can be produced in the form of an aqueous dispersion by a known method. For example, in cases where the silicone elastomer is obtained by curing via an addition reaction, the method used may be one that involves adding a surfactant and water to a curable liquid silicone composition composed of the above olefinically unsaturated group-containing organopolysiloxane and organohydrogenpolysiloxane, carrying out emulsification so as to form an emulsion, and then adding a platinum family metal-based catalyst and carrying out an addition reaction.

So long as the method is one in which this curable liquid silicone composition is emulsified and a curing reaction is subsequently carried out, the shape of the resulting particles will be spherical.

The surfactant used here may be a nonionic surfactant, a cationic surfactant or an amphoteric surfactant. These may be of one type used alone, or two or more types may be suitably combined and used together. An anionic surfactant may suppress the action of the cationic surfactant or cationic water-soluble polymeric compound that is used in the subsequently described silica coating step, or may cause a loss in dispersibility of the spherical silicone elastomer particles when the cationic surfactant or cationic water-soluble polymeric compound is added, giving rise to agglomeration.

Examples of the nonionic surfactant used here include polyoxyethylene alkyl ethers, polyoxyethylene polyoxypropylene alkyl ethers, polyoxyethylene alkyl phenyl ethers, polyethylene glycol fatty acid esters, sorbitan fatty acid esters, polyoxyethylene sorbitan fatty acid esters, polyoxyethylene sorbitol fatty acid esters, glycerol fatty acid esters, polyoxyethylene glycerol fatty acid esters, polyglycerol fatty acid esters, propylene glycol fatty acid esters, polyoxyethylene castor oil, polyoxyethylene hydrogenated castor oil, polyoxyethylene hydrogenated castor oil fatty acid esters, polyoxyethylene alkyl amines, polyoxyethylene fatty acid amides, polyoxyethylene-modified organopolysiloxanes and polyoxyethylene polyoxypropylene-modified organopolysiloxanes.

Examples of cationic surfactants include alkyltrimethylammonium salts, dialkyldimethylammonium salts, polyoxyethylene alkyldimethylammonium salts, dipolyoxyethylene alkylmethylammonium salts, tripolyoxyethylene alkylammonium salts, alkylbenzyldimethylammonium salts, alkylpyridium salts, monoalkylamine salts and monoalkylamide amine salts.

Examples of amphoteric surfactants include alkyldimethylamine oxides, alkyldimethylcarboxybetaines, alkylamidopropyldimethylcarboxybetaines, alkyl hydroxysulfobetaines and alkylcarboxymethylhydroxyethylimidazolinium betaines.

From the standpoint of the ability of the surfactant, when used in a small amount, to emulsify the curable liquid silicone composition and render it into fine particles, a nonionic surfactant is preferred. When too much surfactant is included, coating the silica by the subsequently described production method may become difficult. The amount of surfactant used is preferably 20 parts by weight or less per 100 parts by weight of the ingredients having reactive groups in the curing reaction. At less than 0.01 part by weight, it is difficult to render the curable liquid silicone composition into fine particles. Hence, the amount of surfactant is set in the range of preferably 0.01 to 20 parts by weight, and more preferably 0.05 to 5 parts by weight.

Emulsification may be carried out using a common emulsifying disperser, examples of which include high-speed rotary centrifugal radiation-type stirrers such as homogenizing dispersers, high-speed rotary shear-type stirrers such as homogenizing mixers, high-pressure jet-type emulsifying dispersers such as homogenizers, colloid mills and ultrasonic emulsifiers. So long as emulsification is possible and the composition can be rendered to the desired particle size, the stirring speed, time and the like are not particularly limited. The type of emulsion is an oil-in-water emulsion.

In cases where the platinum family metal-based catalyst has a poor dispersibility in water, it is preferably added to the emulsion in a surfactant-solubilized state. The surfactant is exemplified by those mentioned above, with a nonionic surfactant being especially preferred.

The addition reaction may be carried out at room temperature. If the reaction does not go to completion at room temperature, it may be carried out under heating at below 100° C. The addition reaction time is suitably selected.

As mentioned above, when the curable liquid silicone composition has been emulsified and a curing reaction has been carried out thereafter, an aqueous dispersion of spherical silicone elastomer particles can be obtained.

[Silica]

In the silica-coated particles produced by the inventive method, the silica coating the particles is obtained by a hydrolytic/condensation reaction on a tetraalkoxysilane and has a structure composed of $SiO_2$ units, although it may contain alkoxy groups from the tetraalkoxysilane serving as the starting material and silanol groups which have not incurred a condensation reaction.

The coating silica has a granular shape and a particle size of 500 nm or less. The silica may be on part or all of the surfaces of the spherical silicone elastomer particles, although it preferably extends over the entire surfaces of the spherical silicone elastomer particles and covers the particle surfaces with substantially no gaps. The covering state and particle size can be ascertained by examining the particle surfaces with an electron microscope.

[Silica-Coated Particles]

In the silica-coated spherical silicone elastomer particles obtained by the production method of the invention, wherein the surfaces of the particles are coated with silica, the ratio of the silica per 100 parts by weight of the spherical silicone elastomer particles is from 0.5 to 200 parts by weight, and preferably from 1 to 50 parts by weight. At an amount of silica below 0.5 part by weight, the particles have a strong tendency to agglomerate and the dispersibility worsens; at more than 200 parts by weight, the stress relaxing ability becomes poor and a soft touch fails to appear.

The silica-coated particles have a particle shape that is spherical. The volume mean particle size is from 0.1 to 100 µm, and preferably from 0.5 to 40 µm. When the silica-coated particles have a volume mean particle size below 0.1 µm, the tendency to agglomerate is high, as a result of which the particles do not readily disperse down to primary particles. On the other hand, when the volume mean particle size of the silica-coated particles is larger than 100 µm, in resin stress relaxing agent applications, properties such as the strength of the base resin are compromised, in addition to which a stress relaxing effect may not be sufficiently exhibited. Moreover, in cosmetic applications, the silky feel and smoothness may diminish and a gritty feel may arise.

[Method for Producing Silica-Coated Particles]

The inventive method for producing silica-coated particles includes the step of coating the surfaces of spherical silicone elastomer particles with silica by adding (E) a tetraalkoxysilane to a liquid containing (A) spherical silicone elastomer particles, (B) an alkaline substance, (C) one or more ingredient selected from cationic surfactants and cationic water-soluble polymeric compounds and (D) water and subjecting the tetraalkoxysilane to hydrolytic condensation. First, components (A) to (D) are described.

(A) Spherical Silicone Elastomer Particles

It is preferable to use an aqueous dispersion of the above-described spherical silicone elastomer particles as the spherical silicone elastomer particles. In such cases, the spherical silicone elastomer particles (A) and water (D) are included in the aqueous dispersion. A cationic surfactant (C) is also sometimes included. The aqueous dispersion may be used directly as is, or water may be further added thereto. The content of the spherical silicone elastomer particles (A) is in the range of preferably 1 to 150 parts by weight, and more preferably 3 to 70 parts by weight, per 100 parts by weight of the water (D) in the liquid containing (A) to (D). At less than 1 part by weight, the formation efficiency of the target particles may become low; at more than 150 parts by weight, it may be difficult to coat the surfaces of the spherical silicone elastomer particles with silica, in addition to which agglomeration and fusion of the particles may arise.

(B) Alkaline Substance

The alkaline substance serves as a hydrolytic condensation reaction catalyst for the tetraalkoxysilane. The alkaline substance may be of one type used alone or two or more may be used together.

The alkaline substance is not particularly limited. Examples of alkaline substances that may be used include alkali metal hydroxides such as potassium hydroxide, sodium hydroxide and lithium hydroxide; alkaline earth metal hydroxides such as calcium hydroxide and barium hydroxide; alkali metal carbonates such as potassium carbonate and sodium carbonate; ammonia; tetraalkylammonium hydroxides such as tetramethylammonium hydroxide and tetraethylammonium hydroxide; and amines such as monomethylamine, monoethylamine, monopropylamine, monobutylamine, monopentylamine, dimethylamine, diethylamine, trimethylamine, triethanolamine and ethylenediamine. These may be used singly or two or more may be suitably combined and used together. Of these, ammonia is most suitable because it can easily be removed from the resulting silica-coated particle powder by evaporation. A commercially available ammonia water solution may be used as the ammonia.

The amount of component (B) added is an amount such that the liquid containing components (A) to (D) has a pH at 25° C. in the range of preferably 9.0 to 12.0, and more preferably 10.0 to 11.0. When the alkaline substance is added in an amount such as to set the pH to between 9.0 and 12.0, the hydrolytic condensation reaction on the tetraalkoxysilane proceeds, resulting in a product in which silica coverage on surfaces of the spherical silicone elastomer particles is fully adequate.

(C) One or More Substance Selected from Cationic Surfactants and Cationic Water-Soluble Polymeric Compounds The cationic surfactant or cationic water-soluble polymeric compound serves to promote a condensation reaction on the hydrolyzed tetraalkoxysilane and thereby effect the formation of silica. It may also possibly have the action of inducing the formed silica to adsorb to the surfaces of the spherical silicone elastomer particles. The cationic surfactant and cationic water-soluble polymeric compound may be used singly or two or more may be suitably combined and used together.

The cationic surfactant here is exemplified in the same way as that used above in the method for producing spherical silicone elastomer particles.

Examples of the cationic water-soluble polymeric compound include polymers of dimethyldiallylammonium chloride, vinylimidazoline polymers, polymers of methylvinylimidazolium chloride, polymers of acryloyl ethyltrimethylammonium chloride, polymers of methacryloyl ethyltrimethylammonium chloride, polymers of acrylamide propyltrimethylammonium chloride, polymers of methacrylamide propyltrimethylammonium chloride, polymers of epichlorohydrin/dimethylamine, ethyleneimine polymers, quaternarized products of ethyleneimine polymers, polymers of allylamine hydrochloride, polylysine, cationic starches, cationized celluloses, chitosan, and derivatives of any of the above obtained by copolymerizing a nonionic group or anionic group-containing monomer with these.

Component (C) is preferably an alkyltrimethylammonium salt of a cationic surfactant. Of these, lauryltrimethylammonium salts and cetyltrimethylammonium salts are more preferred.

The amount of component (C) added per 100 parts by weight of water in the liquid containing (A) to (D) is in the range of preferably 0.01 to 2 parts by weight, and more preferably 0.1 to 1 part by weight. At an amount below 0.01 part by weight, silica that does not coat the surfaces of the spherical silicone elastomer particles may form. Likewise, at an amount greater than 2 parts by weight, silica that does not coat the surfaces of the spherical silicone elastomer particles may form.

(D) Water

The water is not particularly limited. For example, purified water or the like may be used. The water includes water within the aqueous dispersion of the spherical silicone elastomer particles and optionally added water.

(E) Tetraalkoxysilane

The tetraalkoxysilane is represented by general formula (6) below

$$Si(OR^5)_4 \quad (6)$$

(wherein $R^5$ is an alkyl group).

The alkyl groups are preferably alkyl groups of 1 to 6 carbon atoms. Specific examples include methyl, ethyl, propyl, butyl, pentyl and hexyl groups. From the standpoint of reactivity, methyl groups or ethyl groups are more preferred. That is, tetramethoxysilane or tetraethoxysilane is more preferred. Tetramethoxysilane is most preferred. A tetraalkoxysilane in which some or all of the alkoxy groups are hydrolyzed may be used. In addition, one in which some of the alkoxy groups are condensed may be used.

Component (E) is added in an amount such that the amount of silica per 100 parts by weight of the spherical silicone elastomer particles (A) falls in the range of 0.5 to 200 parts by weight, and preferably 1 to 50 parts by weight.

[Hydrolytic Condensation Reaction]

The surfaces of the spherical silicone elastomer particles are coated with silica by adding (E) a tetraalkoxysilane to a liquid containing (A) to (D) and subjecting the tetraalkoxysilane to hydrolytic condensation. Specifically, (E) a tetraalkoxysilane is added to an aqueous solution in which spherical silicone elastomer particles are dispersed and (B) an alkaline substance and (C) one or more ingredient selected from cationic surfactants and cationic water-soluble polymeric compounds have been dissolved, and the tetraalkoxysilane is subjected to hydrolytic condensation. The condensation product, i.e., silica, deposits on the surfaces of the spherical silicone elastomer particles, as a result of which the surfaces of the spherical silicone elastomer particles become covered with silica.

Addition of the tetraalkoxysilane is preferably carried out under stirring using an ordinary stirrer having, for example, a propeller element or a flat-blade element. The tetraalkoxysilane may be added all at once, although addition over a period of time is preferred. The dropwise addition time is preferably in the range of 1 minute to 6 hours, and more preferably 10 minutes to 3 hours.

The temperature at this time is set in the range of preferably 0° C. to 60° C., and more preferably 0° C. to 40° C. When the temperature is between 0° C. and 60° C., the surfaces of the spherical silicone elastomer particles can be covered with the silica.

Following addition of the tetraalkoxysilane, stirring is continued up until the hydrolytic condensation reaction on the tetraalkoxysilane reaches completion. In order to have the hydrolytic condensation reaction reach completion, it may be carried out at room temperature or may be carried out under heating at between about 40° C. and about 100° C.

[Powderization]

Following the hydrolytic condensation reaction, water is removed from the resulting aqueous dispersion of the inventive particles. Water removal can be carried out by heating the aqueous dispersion under normal pressure or reduced pressure following the reaction. Specific methods for doing so include, for example, a method that removes water by having the dispersion stand at rest under heating, a method that removes water while stirring and causing the dispersion to flow under applied heat, a method that atomizes and disperses the dispersion in a stream of hot air such as with a spray dryer, and a method that utilizes a fluidized heating medium. Pretreatment for this operation may involve concentrating the dispersion by a method such as dewatering under applied heat, filtration separation, centrifugal separation or decantation. If necessary, the dispersion may be washed with water or alcohol.

In cases where the product obtained by removing water from the aqueous dispersion following the reaction has agglomerated, spherical silicone elastomer particles in which the particle surfaces are coated with silica can be obtained by disintegration in a grinding mill such as a jet mill, ball mill or hammer mill.

EXAMPLES

The invention is illustrated more fully below by way of Examples and Comparative Examples, although the invention is not limited by these Examples. In the Examples, unless noted otherwise, the symbol "%" indicating concentrations and content ratios stands for percent by weight, and the term "parts" stands for parts by weight. Kinematic viscosities are values measured at 25° C.

Example 1

A glass beaker with a 1-liter capacity was charged with 348 g of methylvinylpolysiloxane of average formula (7) below having a kinematic viscosity of 8.4 mm²/s and 152 g of methylhydrogenpolysiloxane of average formula (8) below having a kinematic viscosity of 12 mm²/s (the amounts included being such that the number of hydrosilyl groups per olefinically unsaturated group is 1.15), and the dissolution was effected by stirring at 2,000 rpm using a homogenizing mixer. Next, 2 g of polyoxyethylene lauryl ether (number of moles of ethylene oxide added=9) and 50 g of water were added, and stirring was carried out at 6,000 rpm using a homogenizing mixer, whereupon an oil-in-water system formed and thickening was observed; stirring was continued thereafter for another 15 minutes. Next, 446 g of water was added under stirring at 2,000 rpm, thereby giving a uniform white emulsion. This emulsion was transferred to a glass flask having a 1-liter capacity and equipped with a stirrer that uses an anchor stirring element and temperature-conditioned at between 15° C. and 20° C., following which a mixture of 1 g of an isododecane solution of a platinum-vinyl group-containing disiloxane complex (platinum content, 0.5%) and 1 g of polyoxyethylene lauryl ether (number of moles of ethylene oxide added=9) was added under stirring. Stirring was carried out for 12 hours at the same temperature, giving an aqueous dispersion of spherical silicone elastomer particles.

[Chem. 3]

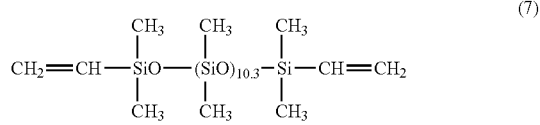

(7)

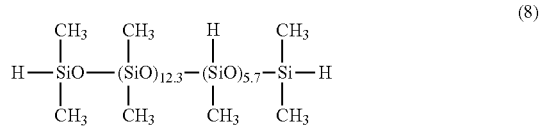

(8)

The shapes of the spherical silicone elastomer particles in the resulting aqueous dispersion were examined under an optical microscope and found to be spherical. The volume mean particle size, as measured using an electrical sensing zone particle size analyzer (Multisizer 3, from Beckman Coulter KK), was 5 μm.

The hardness of the silicone elastomer making up the spherical silicone elastomer particles was measured as follows. The methylvinylpolysiloxane of formula (7), the methylhydrogenpolysiloxane of formula (8) and an isododecane solution of a platinum-vinyl group-containing disiloxane complex (platinum content, 0.5%) were mixed together in the above-indicated proportions and cast into an aluminum Petri dish to a thickness of 10 mm. After being left to stand at 25° C. for 24 hours, the material was heated for one hour in a 50° C. thermostatic chamber, giving a tack-free silicone elastomer. The hardness of the silicone elastomer was measured with a Type A durometer, and found to be 68.

Next, 210 g of the aqueous dispersion of the spherical silicone elastomer particles obtained above was transferred to a 2-liter glass flask equipped with a stirrer that uses an anchor stirring element, and 704 g of water, 3.7 g of 2.8% ammonia water and 12 g of a 30% aqueous solution of lauryltrimethylammonium chloride (trade name: Cation BB, from NOF Corporation) (an amount that sets the lauryltrimethylammonium chloride to 0.44 part per 100 parts of water) were added. The pH of the liquid at this time was 10.4. After temperature conditioning at between 5° C. and 10° C., 70.7 g of tetramethoxysilane (an amount that sets the silica following the hydrolytic condensation reaction to 27 parts per 100 parts of the spherical silicone elastomer particles) was added dropwise over 60 minutes, during which time the liquid temperature was held at between 5° C. and 10° C., following which 3 hours of stirring was carried out. Next, the system was heated to between 70° C. and 75° C. and one hour of stirring was carried out while maintaining this temperature, thereby bringing the hydrolytic condensation reaction on the tetramethoxysilane to completion.

The liquid that was obtained by carrying out a hydrolytic condensation reaction on the tetramethoxysilane in the aqueous dispersion of spherical silicone elastomer particles was dewatered to a water content of about 30% using a press filter. The dewatered material was transferred to a 2-liter glass flask equipped with a stirrer that uses an anchor stirring element, 1,000 g of water was added and stirring was carried out for 30 minutes, following which dewatering was carried out using a press filter. The dewatered material was again transferred to a 2-liter glass flask equipped with a stirrer that uses an anchor stirring element, 1,000 g of water was added and stirring was carried out for 30 minutes, following which dewatering was carried out using a press filter. The dewatered material was dried at a temperature of 105° C. in a hot air fluidized bed dryer and the dried material was disintegrated in a jet mill, giving particles having flowability. The resulting particles were poured into water and stirred, whereupon the particles dispersed in the water.

The resulting particles were examined under an electron microscope, whereupon they were confirmed to be spherical silicone elastomer particles whose surfaces were entirely covered with silica having a granular shape (silica-covered spherical silicone elastomer particles). A photograph is shown in FIG. 1.

The particle size of the resulting silica-coated spherical silicone elastomer particles was measured using an electrical sensing zone particle size analyzer (Multisizer 3, from Beckman Coulter KK). The particle size distribution was the same as for the above aqueous dispersion of spherical silicone elastomer particles and the volume mean particle size was 5 μm.

Example 2

A glass beaker with a 1-liter capacity was charged with 139 g of methylvinylpolysiloxane of average formula (7) above having a kinematic viscosity of 8.4 mm$^2$/s and 61 g of methylhydrogenpolysiloxane of average formula (8) above having a kinematic viscosity of 12 mm$^2$/s (the amounts included being such that the number of hydrosilyl groups per olefinically unsaturated group is 1.16), and dissolution was effected by stirring at 2,000 rpm using a homogenizing mixer. Next, 1 g of polyoxyethylene lauryl ether (number of moles of ethylene oxide added=9) and 200 g of water were added, and stirring was carried out at 6,000 rpm using a homogenizing mixer, whereupon an oil-in-water system formed and thickening was observed; stirring was continued thereafter for another 15 minutes. Next, 446 g of water was added under stirring at 2,000 rpm and the contents were passed once through a homogenizer at a pressure of 30 MPa, thereby giving a uniform white emulsion. This emulsion was transferred to a glass flask having a 1-liter capacity and equipped with a stirrer that uses an anchor stirring element and temperature-conditioned at between 15° C. and 20° C., following which a mixture of 0.5 g of an isododecane solution of a platinum-vinyl group-containing disiloxane complex (platinum content, 0.5%) and 1 g of polyoxyethylene lauryl ether (number of moles of ethylene oxide added=9) was added under stirring. Stirring was carried out for 12 hours at the same temperature, giving an aqueous dispersion of spherical silicone elastomer particles.

The shapes of the spherical silicone elastomer particles in the resulting aqueous dispersion were examined under an optical microscope and found to be spherical. The volume mean particle size, as measured using an electrical sensing zone particle size analyzer (Multisizer 3, from Beckman Coulter KK), was 2 μm.

Next, 400 g of the aqueous dispersion of the spherical silicone elastomer particles obtained above was transferred to a 2-liter glass flask equipped with a stirrer that uses an anchor stirring element, and 549 g of water, 2.4 g of 2.8% ammonia water and 13 g of a 30% aqueous solution of lauryltrimethylammonium chloride (trade name: Cation BB, from NOF Corporation) (an amount that sets the lauryltrimethylammonium chloride to 0.44 part per 100 parts of water) were added. The pH of the liquid at this time was 10.5. After temperature conditioning at between 5° C. and 10° C., 35.8 g of tetramethoxysilane (an amount that sets the silica following the hydrolytic condensation reaction to 18 parts per 100 parts of the spherical silicone elastomer particles) was added dropwise over 30 minutes, during which time the liquid temperature was held at between 5° C. and 10° C., following which 3 hours of stirring was carried out. Next, the system was heated to between 70° C. and 75° C. and one hour of stirring was carried out while maintaining this temperature, thereby bringing the hydrolytic condensation reaction on the tetramethoxysilane to completion.

The liquid that was obtained by carrying out a hydrolytic condensation reaction on the tetramethoxysilane in the aqueous dispersion of spherical silicone elastomer particles was dewatered to a water content of about 30% using a press filter. The dewatered material was transferred to a 2-liter glass flask equipped with a stirrer that uses an anchor stirring element, 1,000 g of water was added and stirring was carried out for 30 minutes, following which dewatering was carried out using a press filter. The dewatered material was again transferred to a 2-liter glass flask equipped with a stirrer that uses an anchor stirring element, 1,000 g of water was added and stirring was carried out for 30 minutes, following which dewatering was carried out using a press filter. The dewatered material was dried at a temperature of 105° C. in a hot air fluidized bed dryer and the dried material was disintegrated in a jet mill, giving particles having flowability.

The resulting particles were examined under an electron microscope, whereupon they were confirmed to be spherical silicone elastomer particles whose surfaces were entirely covered with silica having a granular shape (silica-covered spherical silicone elastomer particles).

The resulting silica-coated spherical silicone elastomer particles were dispersed in water using a surfactant and measured with an electrical sensing zone particle size analyzer (Multisizer 3, from Beckman Coulter KK). The particle size distribution was the same as for the above aqueous dispersion of spherical silicone elastomer particles and the volume mean particle size was 2 μm.

Example 3

An aqueous dispersion of spherical silicone elastomer particles obtained in the same way as in Example 2, in an amount of 750 g, was transferred to a 2-liter glass flask equipped with a stirrer that uses an anchor stirring element, and 203 g of water, 2.3 g of 2.8% ammonia water and 12 g of a 30% aqueous solution of lauryltrimethylammonium chloride (trade name: Cation BB, from NOF Corporation) (an amount that sets the lauryltrimethylammonium chloride to 0.44 part per 100 parts of water) were added. The pH of the liquid at this time was 10.6. After temperature conditioning at between 5° C. and 10° C., 33.1 g of tetramethoxysilane (an amount that sets the silica following the hydrolytic condensation reaction to 8.7 parts per 100 parts of the spherical silicone elastomer particles) was added dropwise over 30 minutes, during which time the liquid temperature was held at between 5° C. and 10° C., following which 3 hours of stirring was carried out. Next, the system was heated to between 70° C. and 75° C. and one hour of stirring was carried out while maintaining this temperature, thereby bringing the hydrolytic condensation reaction on the tetramethoxysilane to completion.

The liquid that was obtained by carrying out a hydrolytic condensation reaction on the tetramethoxysilane in the aqueous dispersion of spherical silicone elastomer particles was dewatered to a water content of about 30% using a press filter. The dewatered material was transferred to a 2-liter glass flask equipped with a stirrer that uses an anchor stirring element, 1,000 g of water was added and stirring was carried out for 30 minutes, following which dewatering was carried out using a press filter. The dewatered material was again transferred to a 2-liter glass flask equipped with a stirrer that uses an anchor stirring element, 1,000 g of water was added and stirring was carried out for 30 minutes, following which dewatering was carried out using a press filter. The dewatered material was dried at a temperature of 105° C. in a hot air fluidized bed dryer and the dried material was disintegrated in a jet mill, giving particles having flowability.

The resulting particles were examined under an electron microscope, whereupon they were confirmed to be spherical silicone elastomer particles whose surfaces were entirely covered with silica having a granular shape (silica-covered spherical silicone elastomer particles).

The resulting silica-coated spherical silicone elastomer particles were dispersed in water using a surfactant and measured with an electrical sensing zone particle size analyzer (Multisizer 3, from Beckman Coulter KK). The particle size distribution was the same as for the above aqueous dispersion of spherical silicone elastomer particles and the volume mean particle size was 2 μm.

Example 4

A glass beaker with a 1-liter capacity was charged with 500 g of methylvinylpolysiloxane of average formula (9) below having a kinematic viscosity of 600 mm$^2$/s and 20 g of methylhydrogenpolysiloxane of average formula (10) below having a kinematic viscosity of 27 mm$^2$/s (the amounts included being such that the number of hydrosilyl groups per olefinically unsaturated group is 1.13), and dissolution was effected by stirring at 2,000 rpm using a homogenizing mixer. Next, 3 g of polyoxyethylene lauryl ether (number of moles of ethylene oxide added=9) and 65 g of water were added, and stirring was carried out at 6,000 rpm using a homogenizing mixer, whereupon an oil-in-water system formed and thickening was observed; stirring was continued thereafter for another 15 minutes. Next, 410 g of water was added under stirring at 2,000 rpm, thereby giving a uniform white emulsion. This emulsion was transferred to a glass flask having a 1-liter capacity and equipped with a stirrer that uses an anchor stirring element and temperature-conditioned at between 15° C. and 20° C., following which a mixture of 1 g of a toluene solution of a platinum-vinyl group-containing disiloxane complex (platinum content, 0.5%) and 1 g of polyoxyethylene lauryl ether (number of moles of ethylene oxide added=9) was added under stirring. Stirring was carried out for 12 hours at the same temperature, giving an aqueous dispersion of spherical silicone elastomer particles.

[Chem. 4]

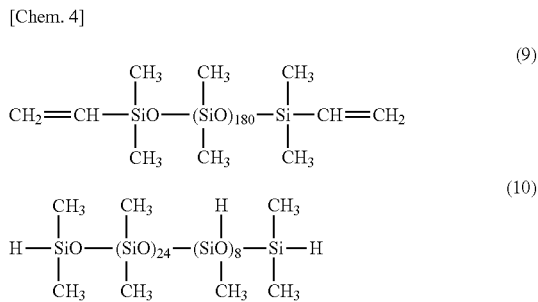

The shapes of the spherical silicone elastomer particles in the resulting aqueous dispersion were examined under an optical microscope and found to be spherical. The volume mean particle size, as measured using an electrical sensing zone particle size analyzer (Multisizer 3, from Beckman Coulter KK), was 5 μm.

The hardness of the silicone elastomer making up the spherical silicone elastomer particles was measured as follows. The methylvinylpolysiloxane of formula (9), the methylhydrogenpolysiloxane of formula (10) and a toluene solution of a platinum-vinyl group-containing disiloxane complex (platinum content, 0.5%) were mixed together in the above-indicated proportions and cast into an aluminum Petri dish to a thickness of 10 mm. After being left to stand at 25° C. for 24 hours, the material was heated for one hour in a 50° C. thermostatic chamber, giving a tack-free silicone elastomer. The hardness of the silicone elastomer was measured with a Type A durometer, and found to be 28.

Next, 288 g of the aqueous dispersion of the spherical silicone elastomer particles obtained above was transferred to a 2-liter glass flask equipped with a stirrer that uses an anchor stirring element, and 671 g of water, 2.2 g of 28% ammonia water and 6 g of a 30% aqueous solution of lauryltrimethylammonium chloride (trade name: Cation BB, from NOF Corporation) (an amount that sets the lauryltrimethylammonium chloride to 0.22 part per 100 parts of water) were added. The pH of the liquid at this time was 10.2. After temperature conditioning at between 5° C. and 10° C., 33.1 g of tetramethoxysilane (an amount that sets the silica following the hydrolytic condensation reaction to 8.7 parts per 100 parts of the spherical silicone elastomer particles) was added dropwise over 30 minutes, during which time the liquid temperature was held at between 5° C. and 10° C., following which 3 hours of stirring was carried out. Next, the system was heated to between 55° C. and 60° C. and one hour of stirring was carried out while maintaining this temperature, thereby bringing the hydrolytic condensation reaction on the tetramethoxysilane to completion.

The liquid that was obtained by carrying out a hydrolytic condensation reaction on the methyltrimethoxysilane in the aqueous dispersion of spherical silicone elastomer particles was dewatered to a water content of about 30% using a press filter. The dewatered material was transferred to a 2-liter glass flask equipped with a stirrer that uses an anchor stirring element, 1,000 g of water was added and stirring was carried out for 30 minutes, following which dewatering was carried out using a press filter. The dewatered material was again transferred to a 2-liter glass flask equipped with a stirrer that uses an anchor stirring element, 1,000 g of water was added and stirring was carried out for 30 minutes, following which dewatering was carried out using a press filter. The dewatered material was dried at a temperature of 105° C. in a hot air fluidized bed dryer and the dried material was disintegrated in a jet mill, giving particles having flowability.

The resulting particles were examined under an electron microscope, whereupon they were confirmed to be spherical silicone elastomer particles whose surfaces were entirely covered with silica having a granular shape (silica-covered spherical silicone elastomer particles).

The resulting silica-coated spherical silicone elastomer particles were dispersed in water using a surfactant and measured with an electrical sensing zone particle size analyzer (Multisizer 3, from Beckman Coulter KK). The particle size distribution was the same as for the above aqueous dispersion of spherical silicone elastomer particles and the volume mean particle size was 5 μm.

Example 5

An aqueous dispersion of spherical silicone elastomer particles obtained in the same way as in Example 1, in an amount of 300 g, was transferred to a 2-liter glass flask equipped with a stirrer that uses an anchor stirring element, and 659 g of water, 2.3 g of 2.8% ammonia water, and both 1.8 g of a 30% aqueous solution of lauryltrimethylammonium chloride (trade name: Cation BB, from NOF Corporation) and 4.2 g of a 30% aqueous solution of cetyltrimethylammonium chloride (trade name: Quartamin 60W, from Kao Corporation) (these being amounts that set the combined amount of lauryltrimethylammonium chloride and cetyltrimethylammonium chloride to 0.22 part per 100 parts of water) were added. The pH of the liquid at this time was 10.6. After temperature conditioning at between 5° C. and 10° C., 33.1 g of tetramethoxysilane (an amount that sets the silica following the hydrolytic condensation reaction to 8.7 parts per 100 parts of the spherical silicone elastomer particles) was added dropwise over 30 minutes, during which time the liquid temperature was held at between 5° C. and 10° C., following which 3 hours of stirring was carried out. Next, the system was heated to between 70° C. and 75° C. and one hour of stirring was carried out while maintaining this temperature, thereby bringing the hydrolytic condensation reaction on the tetramethoxysilane to completion.

The liquid that was obtained by carrying out a hydrolytic condensation reaction on the tetramethoxysilane in the aqueous dispersion of spherical silicone elastomer particles was dewatered to a water content of about 30% using a press filter. The dewatered material was transferred to a 2-liter glass flask equipped with a stirrer that uses an anchor stirring element, 1,000 g of water was added and stirring was carried out for 30 minutes, following which dewatering was carried out using a press filter. The dewatered material was again transferred to a 2-liter glass flask equipped with a stirrer that uses an anchor stirring element, 1,000 g of water was added and stirring was carried out for 30 minutes, following which dewatering was carried out using a press filter. The dewatered material was dried at a temperature of 105° C. in a hot air fluidized bed dryer and the dried material was disintegrated in a jet mill, giving particles having flowability.

The resulting particles were examined under an electron microscope, whereupon they were confirmed to be spherical silicone elastomer particles whose surfaces were entirely covered with silica having a granular shape (silica-covered spherical silicone elastomer particles).

The resulting silica-coated spherical silicone elastomer particles were dispersed in water using a surfactant and measured with an electrical sensing zone particle size analyzer (Multisizer 3, from Beckman Coulter KK). The particle size distribution was the same as for the above aqueous dispersion of spherical silicone elastomer particles and the volume mean particle size was 5 μm.

Example 6

A glass beaker with a 1-liter capacity was charged with 73 g of methylvinylpolysiloxane of average formula (7) above having a kinematic viscosity of 8.4 mm$^2$/s and 32 g of methylhydrogenpolysiloxane of average formula (8) above having a kinematic viscosity of 12 mm$^2$/s (the amounts included being such that the number of hydrosilyl groups per olefinically unsaturated group is 1.15), and dissolution was effected by stirring at 2,000 rpm using a homogenizing mixer. Next, 0.6 g of polyoxyethylene behenyl ether (number of moles of ethylene oxide added=10), 0.9 g of polyoxyethylene behenyl ether (number of moles of ethylene oxide added=20) and 30 g of water were added, and stirring was carried out at 6,000 rpm using a homogenizing mixer, whereupon an oil-in-water system formed and thickening was observed; stirring was continued thereafter for another 15 minutes. Next, 863 g of water was added under stirring at 2,000 rpm and the contents were passed once through a homogenizer at a pressure of 70 MPa, thereby giving a uniform white emulsion. This emulsion was transferred to a glass flask having a 1-liter capacity and equipped with a stirrer that uses an anchor stirring element and temperature-conditioned at between 15° C. and 20° C., following which a mixture of 0.3 g of an isododecane solution of a platinum-vinyl group-containing disiloxane complex (platinum content, 0.5%) and 0.3 g of polyoxyethylene behenyl ether (number of moles of ethylene oxide added=10) was added under stirring. Stirring was carried out for 12 hours at the same temperature, giving an aqueous dispersion of spherical silicone elastomer particles.

The shapes of the spherical silicone elastomer particles in the resulting aqueous dispersion were examined under an optical microscope and found to be spherical. The volume mean particle size was measured and found to be 0.8 µm.

Next, 963 g of the aqueous dispersion of the spherical silicone elastomer particles obtained above was transferred to a 2-liter glass flask equipped with a stirrer that uses an anchor stirring element, and 2.4 g of 2.8% ammonia water and 6 g of a 30% aqueous solution of lauryltrimethylammonium chloride (trade name: Cation BB, from NOF Corporation) (an amount that sets the lauryltrimethylammonium chloride to 0.21 part per 100 parts of water) were added. The pH of the liquid at this time was 10.4. After temperature conditioning at between 5° C. and 10° C., 28.5 g of tetramethoxysilane (an amount that sets the silica following the hydrolytic condensation reaction to 11 parts per 100 parts of the spherical silicone elastomer particles) was added dropwise over 30 minutes, during which time the liquid temperature was held at between 5° C. and 10° C., following which 3 hours of stirring was carried out. Next, the system was heated to between 70° C. and 75° C. and one hour of stirring was carried out while maintaining this temperature, thereby bringing the hydrolytic condensation reaction on the tetramethoxysilane to completion.

The liquid that was obtained by carrying out a hydrolytic condensation reaction on the tetramethoxysilane in the aqueous dispersion of spherical silicone elastomer particles was dewatered to a water content of about 30% using a press filter. The dewatered material was transferred to a 2-liter glass flask equipped with a stirrer that uses an anchor stirring element, 1,000 g of water was added and stirring was carried out for 30 minutes, following which dewatering was carried out using a press filter. The dewatered material was again transferred to a 2-liter glass flask equipped with a stirrer that uses an anchor stirring element, 1,000 g of water was added and stirring was carried out for 30 minutes, following which dewatering was carried out using a press filter. The dewatered material was dried at a temperature of 105° C. in a hot air fluidized bed dryer and the dried material was disintegrated in a jet mill, giving particles having flowability.

The resulting particles were examined under an electron microscope, whereupon they were confirmed to be spherical silicone elastomer particles whose surfaces were entirely covered with silica having a granular shape (silica-covered spherical silicone elastomer particles).

The resulting silica-coated spherical silicone elastomer particles were dispersed in water using a surfactant and measured with a laser diffraction/scattering type particle size analyzer (LA-960, from Horiba, Ltd.). The particle size distribution was the same as for the above aqueous dispersion of spherical silicone elastomer particles and the volume mean particle size was 0.8 µm.

Example 7

A glass flask having a 100 mL capacity and equipped with a stirrer that uses an anchor stirring element was charged with 45.2 g of tetraethoxysilane. Next, without temperature conditioning, 15.6 g of 1×10⁻⁴ M (mol/L) aqueous hydrochloric acid having a pH of 4.2 was added and stirring was carried out for 1 hour, thereby hydrolyzing the tetraethoxysilane.

An aqueous dispersion of spherical silicone elastomer particles obtained in the same way as in Example 1, in an amount of 300 g, was transferred to a 2-liter glass flask equipped with a stirrer that uses an anchor stirring element, and 631 g of water, 2.2 g of 2.8% ammonia water and 5.9 g of a 30% aqueous solution of lauryltrimethylammonium chloride (trade name: Cation BB, from NOF Corporation) (this being an amount that sets the lauryltrimethylammonium chloride to 0.22 part per 100 parts of water) were added. The pH of the liquid at this time was 10.5. After temperature conditioning at between 5° C. and 10° C., the entire amount of the tetraethoxysilane hydrolyzate prepared above (an amount that sets the silica following the condensation reaction to 8.7 parts per 100 parts of the spherical silicone elastomer particles) was added dropwise over 30 minutes, during which time the liquid temperature was held at between 5° C. and 10° C., following which 3 hours of stirring was carried out. Next, the system was heated to between 70° C. and 75° C. and one hour of stirring was carried out while maintaining this temperature, thereby bringing the hydrolytic condensation reaction on the tetraethoxysilane to completion.

The liquid that was obtained by carrying out a condensation reaction on the tetramethoxysilane hydrolyzate in the aqueous dispersion of spherical silicone elastomer particles was dewatered to a water content of about 30% using a press filter. The dewatered material was transferred to a 2-liter glass flask equipped with a stirrer that uses an anchor stirring element, 1,000 g of water was added and stirring was carried out for 30 minutes, following which dewatering was carried out using a press filter. The dewatered material was again transferred to a 2-liter glass flask equipped with a stirrer that uses an anchor stirring element, 1,000 g of water was added and stirring was carried out for 30 minutes, following which dewatering was carried out using a press filter. The dewatered material was dried at a temperature of 105° C. in a hot air fluidized bed dryer and the dried material was disintegrated in a jet mill, giving particles having flowability.

These particles were examined under an electron microscope, whereupon they were confirmed to be spherical silicone elastomer particles whose surfaces were entirely covered with silica having a granular shape (silica-covered spherical silicone elastomer particles).

The resulting silica-coated spherical silicone elastomer particles were dispersed in water using a surfactant and measured with an electrical sensing zone particle size analyzer (Multisizer 3, from Beckman Coulter KK). The particle size distribution was the same as for the above aqueous dispersion of spherical silicone elastomer particles and the volume mean particle size was 5 µm.

Comparative Example 1

An aqueous dispersion of spherical silicone elastomer particles obtained in the same way as in Example 1, in an amount of 210 g, was transferred to a 2-liter glass flask equipped with a stirrer that uses an anchor stirring element, and 716 g of water and 3.7 g of 2.8% ammonia water were added. The pH of the liquid at this time was 10.4. After temperature conditioning at between 5° C. and 10° C., 70.7 g of tetramethoxysilane (an amount that sets the silica following the hydrolytic condensation reaction to 27 parts per 100 parts of the spherical silicone elastomer particles) was added dropwise over 60 minutes, during which time the liquid temperature was held at between 5° C. and 10° C., following which 3 hours of stirring was carried out. Next, the system was heated to between 70° C. and 75° C. and one hour of stirring was carried out while maintaining this temperature.

The liquid that was obtained by reacting the tetramethoxysilane in the aqueous dispersion of spherical silicone elastomer particles was dewatered to a water content of about 30% using a press filter. The dewatered material was transferred to a 2-liter glass flask equipped with a stirrer that uses an anchor stirring element, 1,000 g of water was added and stirring was carried out for 30 minutes, following which dewatering was carried out using a press filter. The dewatered material was again transferred to a 2-liter glass flask equipped with a stirrer that uses an anchor stirring element, 1,000 g of water was added and stirring was carried out for 30 minutes, following which dewatering was carried out using a press filter. The dewatered material was dried at a temperature of 105° C. in a hot air fluidized bed dryer. The dried material had a high tendency to agglomerate, as a result of which disintegration treatment in a jet mill was impossible.

This dried material was examined under an electron microscope, whereupon a coating was not observed on the surfaces of the spherical silicone elastomer particles.

[Evaluation of Non-Agglomerability (Measurement of Mesh Pass Ratio)]

The non-agglomerabilities of the silica-coated spherical silicone elastomer particles obtained in the Examples and of the dried material obtained in Comparative Example 1 were evaluated by the following method.

A 60 mesh screen, a 100 mesh screen and a 200 mesh screen were stacked in this order from above, about 2 g of a particle sample was weighed out onto the 60 mesh screen and, using a powder characteristics tester (Powder Tester model PT-E, from Hosokawa Micron Corporation), vibrations having an amplitude of 2 mm were applied for 90 seconds and the amounts of sample that passed through the respective screens were measured. The mesh pass ratios are indicated in percent (%), with a higher value being understood to indicate a higher non-agglomerability.

TABLE 1

|  | Non-agglomerability (mesh pass ratio, %) | | |
| --- | --- | --- | --- |
|  | 60 mesh | 100 mesh | 200 mesh |
| Example 1 | 99 | 96 | 93 |
| Example 2 | 94 | 79 | 72 |
| Example 3 | 91 | 73 | 62 |
| Example 4 | 96 | 81 | 72 |
| Example 5 | 98 | 86 | 81 |
| Example 6 | 87 | 71 | 42 |
| Example 7 | 90 | 70 | 49 |
| Comparative Example 1 | 2 | 0 | 0 |

Production of the silica-coated spherical silicone elastomer particles in Examples 1 to 7 was carried out by reacting tetramethoxysilane in a cationic surfactant-containing aqueous dispersion of spherical silicone elastomer particles. In these cases, the surfaces of the spherical silicone elastomer particles are coated with the silica that has formed as the reaction product of hydrolytic condensation of the tetramethoxysilane. The coated particles have a particle size similar to the spherical silicone elastomer particles, and have little tendency to agglomerate.

A cationic surfactant was not used in producing the particles in Comparative Example 1. In this case, silica was not observed on the surfaces of the spherical silicone elastomer particles.

The invention claimed is:

1. A method for producing silica-coated spherical silicone elastomer particles that have a volume-mean particle size of from 0.1 to 100 μm and are made of cured spherical silicone elastomer particles coated on surfaces thereof with granular silica in a ratio of from 0.5 to 200 parts by weight of the silica per 100 parts by weight of the cured spherical silicone elastomer particles, the method comprising the step of:

coating the surfaces of the cured spherical silicone elastomer particles with granular silica by adding (E) a tetraalkoxysilane to a liquid which contains (A) the cured spherical silicone elastomer particles, (B) an alkaline substance, (C) one or more ingredient selected from cationic surfactants and cationic water-soluble polymeric compounds and (D) water and subjecting the tetraalkoxysilane and the liquid having a pH at 25° C. of from 9.0 to 12.0 to hydrolytic condensation.

2. The method for producing silica-coated spherical silicone elastomer particles of claim 1, wherein the amount of component (C) is from 0.01 to 2 parts by weight per 100 parts by weight of component (D).

3. The method for producing silica-coated spherical silicone elastomer particles of claim 1, wherein the liquid containing components (A) to (D) has a pH at 25° C. of from 9.0 to 12.0.

4. The method for producing silica-coated spherical silicone elastomer particles of claim 1, wherein component (E) is tetramethoxysilane.

5. The method for producing silica-coated spherical silicone elastomer particles of claim 1, wherein component (C) is an alkyltrimethylammonium salt.

6. The method for producing silica-coated spherical silicone elastomer particles of claim 1, wherein the cured spherical silicone elastomer particles (A) are obtained by addition reaction of a following combination of (A-1) or (A-2) in a ratio such that there are from 0.5 to 2 hydrosilyl groups per monovalent olefinically unsaturated group in the presence of a platinum family metal catalyst:

combination of (A-1) of an organopolysiloxane of average compositional formula (2) below $$R^2_a R^3_b SiO_{(4-a-b)/2} \tag{2}$$

and having at least two monovalent olefinic unsaturated groups per molecule with an organohydrogenpolysiloxane of average compositional formula (3) below $$R^4_c H_d SiO_{(4-c-d)/2} \tag{3}$$

and having at least three silicon-bonded hydrogen atoms (Si—H) per molecule; or combination of (A-2) of an organopolysiloxane of average compositional formula (2) below $$R^2_a R^3_b SiO_{(4-a-b)/2} \tag{2}$$

and having at least three monovalent olefinic unsaturated groups per molecule with an organohydrogenpolysiloxane of average compositional formula (3) below $$R^4_c H_d SiO_{(4-c-d)/2} \tag{3}$$

and having at least two silicon-bonded hydrogen atoms per molecule, wherein $R^2$ and $R^4$ in the formulas are substituted or unsubstituted monovalent hydrocarbon groups of 1 to 30 carbon atoms, exclusive of aliphatic unsaturated groups, and $R^3$ is a monovalent olefinically unsaturated group of 2 to 6 carbon atoms, and the subscripts "a" and "b" are positive numbers such that $0<a<3$, $0<b\leq3$ and $0.1\leq a+b\leq3$, and preferably such that $0<a\leq2.295$, $0.005\leq b\leq2.3$ and $0.5\leq a+b\leq2.3$; $R^4$ is a substituted or unsubstituted monovalent hydrocarbon group of 1 to 30 carbon atoms, exclusive of aliphatic unsaturated groups, the subscripts "c" and "d" are positive numbers such that $0<c<3$, $0<d\leq3$ and $0.1\leq c+d\leq3$, and preferably such that $0<c\leq2.295$, $0.005\leq d\leq2.3$ and $0.5\leq c+d\leq2.3$.

7. The method for producing silica-coated spherical silicone elastomer particles of claim 1, further comprising, before coating the surfaces of the cured spherical silicone elastomer particles with the granular silica, a step of obtaining the cured spherical silicone elastomer particles by addition reaction of a following combination of (A-1) or (A-2) in a ratio such that there are from 0.5 to 2 hydrosilyl groups per monovalent olefinically unsaturated group in the presence of a platinum family metal catalyst:

combination of (A-1) of an organopolysiloxane of average compositional formula (2) below $$R^2_a R^3_b SiO_{(4-a-b)/2} \tag{2}$$

and having at least two monovalent olefinic unsaturated groups per molecule with an organohydrogenpolysiloxane of average compositional formula (3) below $$R^4_c H_d SiO_{(4-c-d)/2} \tag{3}$$

and having at least three silicon-bonded hydrogen atoms (Si—H) per molecule; or combination of (A-2) of an organopolysiloxane of average compositional formula (2) below $$R^2_a R^3_b SiO_{(4-a-b)/2} \tag{2}$$

and having at least three monovalent olefinic unsaturated groups per molecule with an organohydrogenpolysiloxane of average compositional formula (3) below $$R^4_c H_d SiO_{(4-c-d)/2} \tag{3}$$

and having at least two silicon-bonded hydrogen atoms per molecule, wherein $R^2$ and $R^4$ in the formulas are substituted or unsubstituted monovalent hydrocarbon groups of 1 to 30 carbon atoms, exclusive of aliphatic unsaturated groups, and $R^3$ is a monovalent olefinically unsaturated group of 2 to 6 carbon atoms, and the subscripts "a" and "b" are positive numbers such that $0<a<3$, $0<b\leq3$ and $0.1\leq a+b\leq3$, and preferably such that $0<a\leq2.295$, $0.005\leq b\leq2.3$ and $0.5\leq a+b\leq2.3$; $R^4$ is a substituted or unsubstituted monovalent hydrocarbon group of 1 to 30 carbon atoms, exclusive of aliphatic unsaturated groups, the subscripts "c" and "d" are positive numbers such that $0<c<3$, $0<d\leq3$ and $0.1\leq c+d\leq3$, and preferably such that $0<c\leq2.295$, $0.005\leq d\leq2.3$ and $0.5\leq c+d\leq2.3$.

* * * * *